July 11, 1967

W. E. GOOD ET AL 3,330,908

DEFORMABLE MEDIUM PROJECTION APPARATUS UTILIZING NOVEL OPTICAL
SYSTEM COMPRISING LENS ARRAYS EMPLOYED
IN CONJUNCTION WITH LIGHT MASKS

Filed Oct. 16, 1963

INVENTORS:
WILLIAM E. GOOD,
MICHAEL GRASER, JR.
LAWRENCE A. JUHLIN, JR.

BY *Julius J. Zaskalicky*
THEIR ATTORNEY.

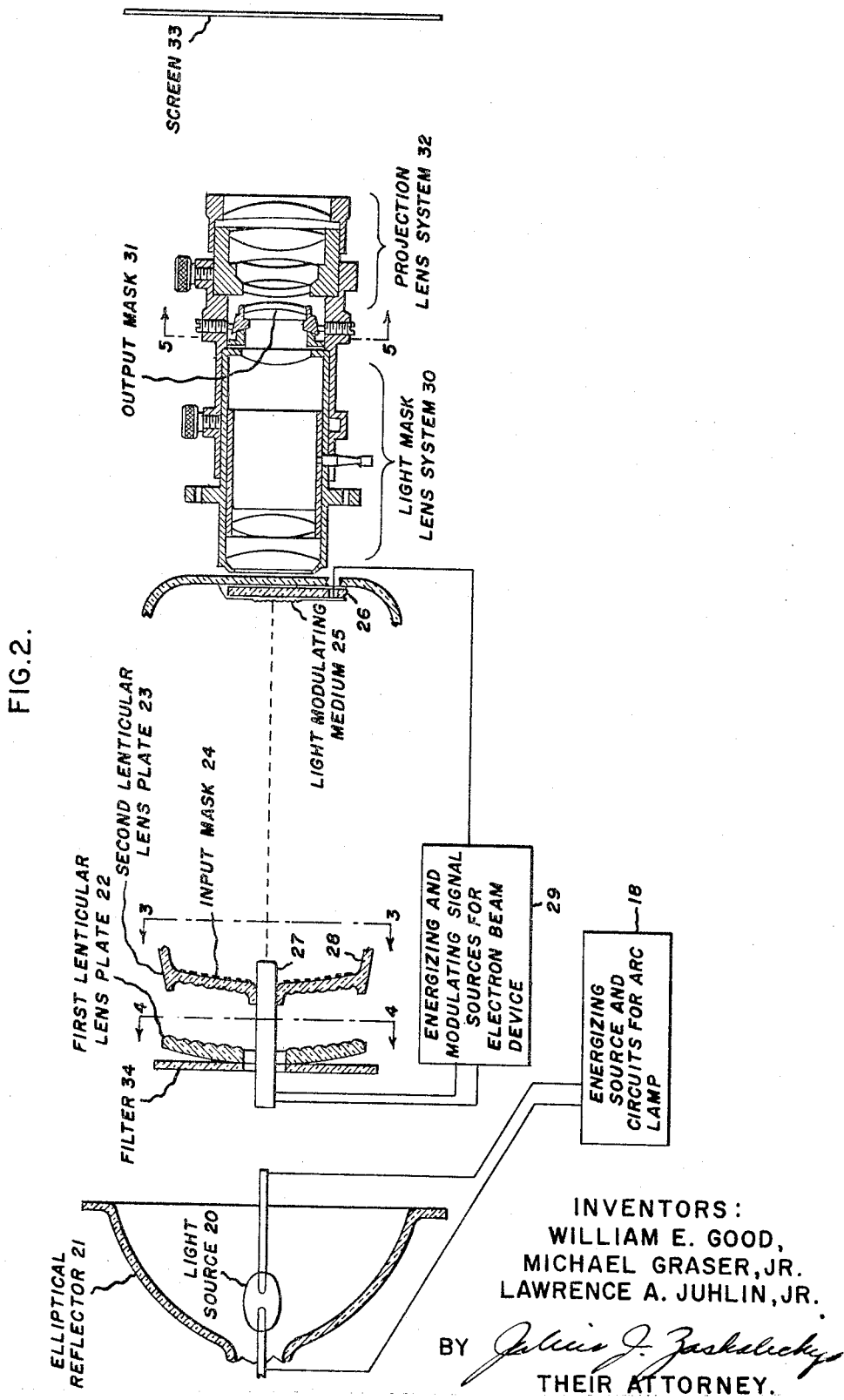

July 11, 1967 W. E. GOOD ET AL 3,330,908
DEFORMABLE MEDIUM PROJECTION APPARATUS UTILIZING NOVEL OPTICAL
SYSTEM COMPRISING LENS ARRAYS EMPLOYED
IN CONJUNCTION WITH LIGHT MASKS
Filed Oct. 16, 1963
3 Sheets-Sheet 3

INVENTORS:
WILLIAM E. GOOD,
MICHAEL GRASER, JR.
LAWRENCE A. JUHLIN, JR.

BY *Julius J. Zuckelsky*
THEIR ATTORNEY.

United States Patent Office 3,330,908
Patented July 11, 1967

3,330,908
DEFORMABLE MEDIUM PROJECTION APPARATUS UTILIZING NOVEL OPTICAL SYSTEM COMPRISING LENS ARRAYS EMPLOYED IN CONJUNCTION WITH LIGHT MASKS
William E. Good, Liverpool, Michael Graser, Jr., Fayetteville, and Lawrence A. Juhlin, Jr., Syracuse, N.Y., assignors to General Electric Company, a corporation of New York
Filed Oct. 16, 1963, Ser. No. 316,606
11 Claims. (Cl. 178—7.87)

The present invention relates to image projection apparatus. One form of such apparatus comprises first and second light masks having similar arrays of transparent and opaque portions therein, a light modulating medium located between the light masks and adapted to be deformed into light diffraction gratings by electron charges deposited thereon in response to electrical signals in correspondence to an image to be projected, and a source of light.

Such apparatus usually includes the following lens systems:

(1) A first lens system for directing light from the light source through the transparent portions of the first or input one of said masks onto the light modulating medium.

(2) A second lens system for imaging the light passed by the transparent portions of the first mask onto corresponding opaque portions of the second mask, and (3) A third lens system for projecting an image of the light modulating medium onto a screen.

The elements of the first lens system are usually situated between the light source and the input mask. The elements of the second lens system may be located either on the light input or light output side of the light modulating medium between the input and output masks. The elements of the third lens system are usually located between the output mask and screen. In the absence of deformations in the modulating medium, light from the source is blocked by the output mask, and does not reach the screen. When the surface of the modulating medium is deformed by the deposition of an electron charge pattern thereon in response to electrical signals corresponding to an image to be projected, light incident on the medium is diffracted and passes through the transparent portions in the output mask onto the screen and forms an image thereon corresponding to the electrical signals.

In such a system, in which light is passed through a plurality of components, efficiency is important. Improvement in the efficiency of an individual component or of a system enables higher light output to be obtained or a smaller light source to be used to produce a predetermined output. Uniform illumination of the active area of the light diffracting medium is also important for excellence in rendition of the projected image.

The present invention has particular application in projection systems of the kind described in which color images are projected by means of orthogonally arranged diffraction gratings. In such a system filters for the various primary colors are utilized with the result that additional attenuation of the light from the source to the light modulating medium is experienced. Also, in such a system one primary color component of light is transmitted through one array of transparent slots and opaque bars in the input mask thereof and the remaining color components are transmitted through another array of transparent slots and opaque bars in the input mask thereof orthogonally arranged with respect to the first array. The width of the slots and bars in each array for the two sets of primary colors is not the same yet the active area of the modulating medium, referred to as the raster area in television projection systems, is the same and the requirement of efficiency and uniformity of light transmission must be met. The raster area is usually of rectangular shape of particular height to width ratio referred to as the aspect ratio.

Accordingly it is an object of the present invention to provide high efficiency illumination optics for the raster area of projection apparatus of the kind described below.

It is another object of the present invention to provide an optical system which uniformly illuminates the raster area.

It is another object of the present invention to provide a simple optical arrangement in color image projection apparatus of the kind described utilizing a minimum of parts which at the same time provides high performance in efficiency and uniformity of illumination of the raster area of a light diffraction medium.

In carrying out the present invention in one illustrative form thereof there is provided in the light input channel of such apparatus a pair of lenticulated plates. One plate includes an array of spherical lenticules, each of which serve to image a source of light on a respective portion of a slot of the input mask thereof. The other plate also includes an array of spherical lenticules, each of which serves to image a respective one of the lenticules on the first mentioned plate onto the raster area of the light diffracting medium. With such an arrangement light from a small source is formed into a plurality of secondary sources each located in one of the slots.

Preferably, the input bar and slot arrays are located close to the second lenticular plate. Preferably, the lenticular plates are sectors of concentric spherical shells, the center of which is the center of the raster area of the light diffracting medium. By proportioning the spacing of the horizontal slots of one array with respect to the spacing of the vertical slots of the other array in accordance with the aspect ratio of raster area, and similarly proportioning the horizontal and lateral dimensions each of the lenticules on each of the lenticular plates, the high efficiency and uniformity of illumination of the raster area is obtained for color projection.

The novel features believed to be characteristic of the invention are set forth in the appended claims. The invention itself, together with further objects and advantages thereof, may best be understood by reference to the following description taken in connection with the accompanying drawings in which:

FIGURE 2 is a side view in section of the optical system of a color television projector making use of the invention.

Figure 1:
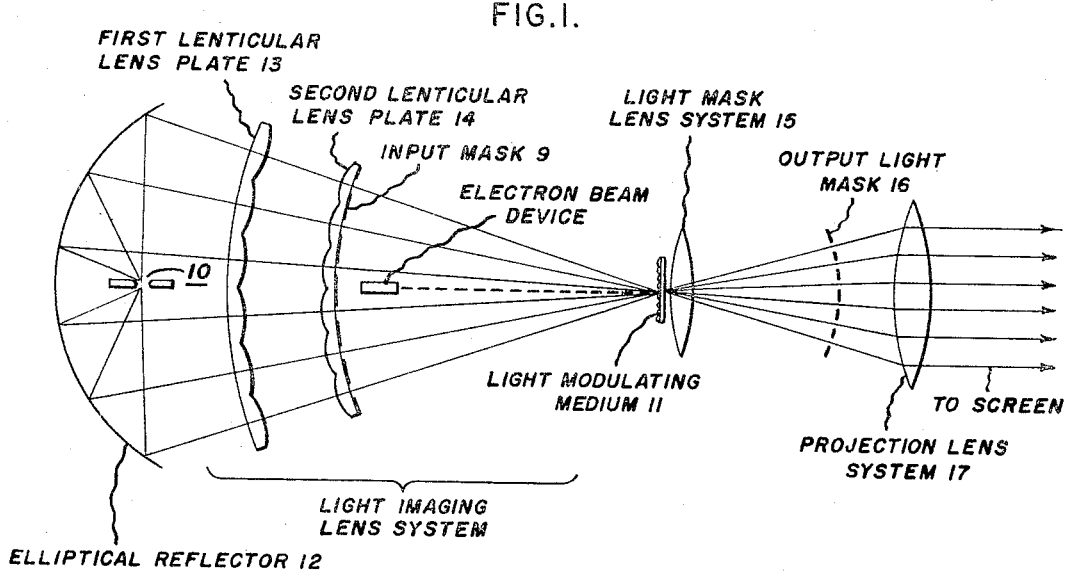
FIGURE 1 is a schematic diagram of the optical system of the invention.

Referring now to FIGURE 1 there is shown the optical channel of a television projection system in which a pair of light masks and a transparent light modulating medium are cooperatively associated to function as a light valve, the light output from which is responsive point by point to the electric signals corresponding to the intensity point by point in a television image to be projected. The light modulating medium is of viscous consistency deformable into phase diffraction gratings by electron charges deposited thereon by such means as an electron beam device (not shown). One of the masks has a plurality of transparent slot portions separated by opaque bar portions and the other mask has similarly oriented transparent slot portions and opaque bar portions. A lens system is provided for imaging the transparent slot portions of the light input mask onto corresponding opaque portions of the output mask. The light modulating media is situated in the path of light from the input mask to the output mask. The phase diffraction gratings are formed in the light modulating medium such that the valleys or lines thereof are aligned in a direction parallel to the direction of the transparent slots and on a surface orthogonal to the light from the input mask directed to the output mask.

With the application of light to the system from a source and in the absence of electrical signals applied to the electron gun the light passed by the input mask is blocked by the output mask. Upon the application of electrical signals to the electron beam device, the light modulating medium is deformed into diffraction gratings and light is deflected orthogonally with respect to the direction of the lines of the diffraction grating thereby producing deviation of the light incident on the transparent light modulating medium so as to pass through corresponding slots in the output mask. The intensity of such light varies point by point in accordance with the depth of the valleys or lines produced by the deposited electron charges which in turn are a function of the amplitude of modulation of the electron beam.

In such a system in view of the large number of elements in the optical channel from the source to the screen, efficient use of light from the source is important. The overall loss of light in the reflector system may be of the order of 50%. The loss of light at the input mask may be 75%, assuming that the slots are 25% of the area of the mask. The loss of light at the color filters such as used in color television projection systems may be as high as 60%. Additionally, losses are experienced in the light modulating medium, in the various lens systems, at the output mask, etc. Thus in such a system eventually less than a few percent of the light from the light source reaches the screen. Accordingly, it is quite important to devise the optical channel of the system to be as efficient as possible. Improved efficiency and its attendant advantages can be achieved by reducing the number of elements, improving the efficiency of each of the elements, and by cooperative association of the elements in a manner to improve efficiency.

In addition to high efficiency in the illumination system, it is important to illuminate uniformly points on the light modulating medium corresponding to picture elements of an image to be projected in order to provide all points with the same initial illumination which then is varied point by point in accordance with the amplitude of a modulating signal responsive to the variations in light intensity and composition of the image to be projected.

The arrangement of the optics on the input side of the light modulating medium in FIGURE 1 is such as to provide high efficiency of illumination of the active area of the light modulating medium from an arc source of light and at the same time to provide a high degree of uniformity of illumination of the area. Included in sequence between the source 10 and the light modulating medium 11 are an elliptical reflector 12, a first lenticular lens plate 13 having located on the surface remote from the source an array of spherical lenticules or small lenses, a second lenticular lens, plate 14, having located on the surface adjacent the light source an array of lenticules and having located on the opposite surface a light mask 9 having a plurality of transparent slots separated by opaque bars. It is understood that the lenticules could be located on either or both sides of either of the lens plates 13 and 14.

The elliptical reflector 12 is arranged such that the light source 10 is at one focus and the center of the active area of the light modulating medium 11, usually referred to as the raster area, is at the other focus. Each of the slots on the input light mask 9 are also arranged so that each of the elements thereof lies in a minimal optical path from one focus of the elliptical reflector at which the light source 10 is located to the other focus of the elliptical reflector at which point the center of the raster area is located. Each of the lenticules on the first lenticular plate 13 are centered on a respective one of the previously mentioned minimal optical paths and has a focal length and is positioned so as to image light from the source 10 onto an element of a slot of the member 9 to provide efficient passage of light therethrough to the raster area. Centering each lenticule on its minimal optical path in connection with a suitably dimensioned elliptical reflector assures that each point of the arc source illuminates each point in the plane of the lenticule consequently providing uniform illumination thereof. Each of the lenticules on the second lenticular plate member 14 also lies on a respective minimal optical path and is arranged to image a corresponding lenticule on the first lens plate 13 onto the raster area of the light modulating medium, thereby to converge any light incident on non-active areas of the light modulating medium, i.e., areas outside of the raster area, as a result of the impinging of light by a lenticule on the first lenticular plate through an element of a slot. Thus, with the arrangement provided, light from the source is formed into a plurality of sources by the elliptical reflector and lens plates directed to maximizing the passage of light through the slots on the input mask. By virtue of centering the lenticules on their minimal optical paths and as well as a result of the overlapping or superposition of such plurality of sources on the raster area uniform illumination of the raster area is achieved.

On the light output side of the light modulating medium 11 are located the light mask imaging lens system 15, the light output mask 16 and projection lens system 17. The light mask lens system 15 images each of the secondary sources in the slots in the input mask onto a respective element or portion of a bar on the output mask in the absence of any modulation in the light modulating medium. Physical modulation in the light modulating medium 11 produces corresponding deviations in the path of the light incident thereon. Such deviations enable the light previously incident on the bars of the output mask to pass through adjacent slots. Such light is then projected by the projection lens system 17 onto a screen. In effect the projection lens system 17 in conjunction with the light mask lens system 15 images the raster area of the light modulating medium on a screen (not shown) to produce a considerably enlarged image thereof. The light mask lens system includes a plurality of lens elements which provide appropriate correction for the various aberrations produced by the lens system. Similarly, the projection lens system includes a plurality of appropriately spaced and arranged lenses to correct any aberrations inherent in a single projection lens to provide a faithful reproduction of the image of the active area.

In FIGURE 2 is shown a color television projection system embodying the invention. This system shows a source 20 of light which may be an electric arc source energized from source 18, an elliptical reflector 21, a first lenticular lens plate 22, a second lenticular lens plate 23 and input light mask 24, which are arranged according to the relationships described in connection to FIGURE 1 with respect to providing uniform and efficient illumination of the light modulating medium 25, such as a suitable oil on a movable and conductive transparent plate 26. (Detail means for applying and moving such a medium is not shown.) The light modulating medium is physically altered by an electron beam from an electron beam device 27 incorporated in an evacuated enclosure 28 and responsive to electrical signals from a source 29 representative of the intensity of the various primary colors point by point in an image to be projected.

On the output side of the light modulating medium 25 is provided a light mask lens system 30, an output light mask 31 and a projection lens system 32. The output mask lens system comprises four elements which function to image the light from the slots in the input mask 24 onto corresponding bars in the output mask 31 in the absence of any physical deformation of the surface of the light modulating medium 25. The projection lens system 32 in combination with the light mask lens system 30 comprises a composite lens system for imaging the light modulating medium on a distant screen 33 on which an image is to be projected. The projection lens system 32 comprises five elements. The plurality of lenses are provided to correct for the various aberrations inherent in a single lens system. The details of the light mask and projection lens system are described in patent application Serial No. 336,505, filed Jan. 8, 1964, now Patent No. 3,328,111, and assigned to the assignee of the present invention.

In a color television system special problems are encountered in providing efficient and uniform illumination from a white light source of light modulating medium. In order to provide good color rendition in an image projected it is necessary to dissect the image element by element into three primary color components of varying intensity. In the system of the kind described in which phase diffraction gratings are formed in a light modulating medium in response to electrical signals in conjunction with a light input and light output mask arrangement to provide a variation point by point in intensity of light passed by a light modulating medium, such rendition must be made for each of the three primary color components. This entails, in the system described, utilization of three diffraction gratings in the light modulating medium, correspondingly associated input slot and bar systems and utilization of primary color filters in the input light path of the system. Various such arrangements are known in the art. One such arrangement, described in patent application Serial No. 343,990, filed Feb. 11, 1964, now patent No. 3,272,917, and assigned to the assignee of the present invention, makes use of an input and output mask having two sets of slot and bar arrangements on each of the light masks. One set on each of the input and output masks is aligned vertically on one portion of the respective mask, and the other set on each of the masks is aligned horizontally on other portions of the respective mask. One system of input and output slots and bars is used in cooperation with similarly oriented phase diffraction gratings in the light modulating medium to project an image in one particular primary color associated with the diffraction grating. The other system of slots and bars and corresponding cooperating diffraction gratings similarly orthogonally oriented are used for rendition of the other two primary colors. A filter 34 is provided so as to permit only light of a predetermined color or colors to be incident on the corresponding slots in the input mask. In one system using green, red and blue, green may be associated with one of the two sets of slot and bar arrangements and the red and blue with the other set of slots and bars. The widths of the slots and bars, in one arrangement or array are one set of values and the width of the slots and bars in the other arrangement is another set of values. The raster area of the modulating medium may be rectangular in shape and has a ratio of height to width or aspect ratio of three to four in accordance with television standards in force in the United States. According to the present invention the center-to-center spacing of slots in the horizontal array is made three-fourths the center-to-center spacing of the slots in the vertical array. Each of the lenticules in each of the lenticular plates are also so proportioned, i.e. with height to width ratio of three to four. The lenticules in each plate are stacked into horizontal rows and vertical columns. Each of the lenticules in one plate are of one focal length and each of the lenticules on the other plate are of another focal length. The filter element may be constituted to have three sections registering light of red and blue color components in the central portion of the input mask and green light in the side sector portions as will be apparent from considering FIGURE 3.

Figure 3:
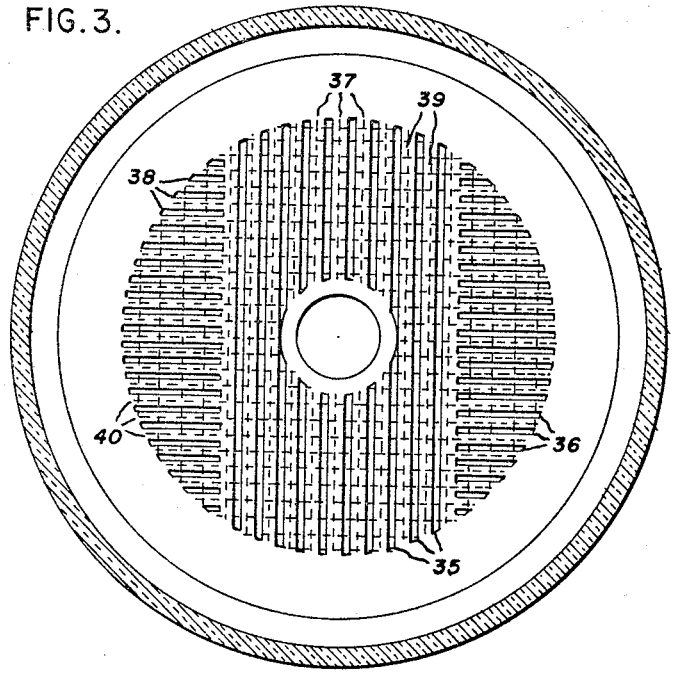
FIGURE 3 is an end view along section 3—3 of the second lenticular lens plate and the input mask thereof of the optical system of FIGURE 2.

In FIGURE 3 is shown a view of the face of the second lenticular lens plate 23 and input mask 24 as seen from the raster area of the modulating medium or along section 3—3 of FIGURE 2. In this figure the vertical oriented slots 35 are utilized in the controlling of the red and blue light color components in the image to be projected. The horizontally extending slots 36 located in the sector area in the input mask on each side of the central portion thereof function to cooperate with the light modulating medium and light output mask to control the green color component in the image to be projected. The ratio of the center-to-center spacing of the horizontal slots 36 to the center-to-center spacing of the vertical slots 35 is three-fourths. The source of light 37 appearing in one of the vertical slots represents the red and blue source appearing on one minimal optical path. The source of light 38 appearing in one of the horizontal slots represents the green source appearing on another minimal optical path as explained in connection with FIGURES 1 and 2. The rectangular areas enclosed by the vertical and horizontal dashes 39 and 40 are the boundaries for the individual lenticules appearing on the opposite face of the plate. The focal length of each of the lenticules is the same. The center of each of the lenticules lies in the center of a slot element.

Figure 4:
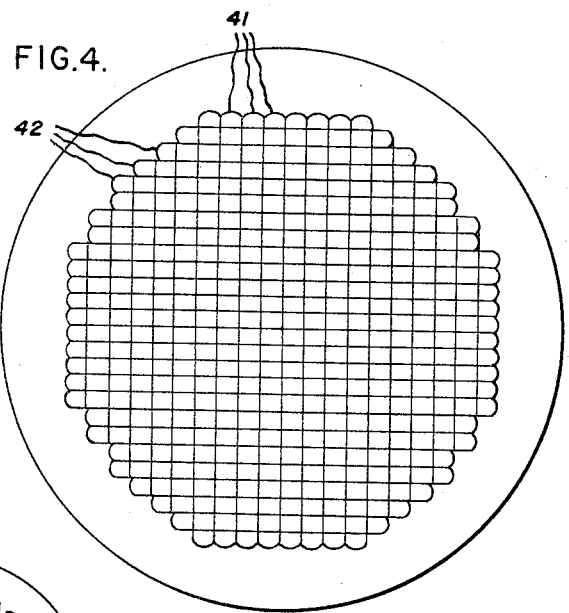
FIGURE 4 is an end view along section 4—4 of FIGURE 2 of the first lenticular lens plate thereof.

FIGURE 4 shows the first lenticular lens plate taken along section 4—4 of FIGURE 2. Each of the lenticules of this plate cooperates with a correspondingly positioned lenticule on the second lenticular lens plate shown in FIGURES 2 and 3 in the manner described above. Each of the lenticules have the same focal length which is different from the focal length of the lenticules of the first lenticular plate.

Figure 5:
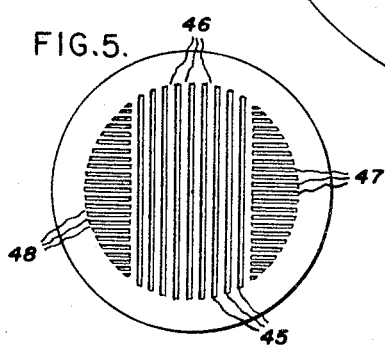
FIGURE 5 is an end view taken along section 5—5 of FIGURE 2 of the output light mask thereof.

FIGURE 5 shows the light output mask of FIGURE 2 taken along section 5—5 thereof. This mask consists of a plurality of transparent slots 45 and opaque bars 46 in a central vertically extending section of the mask and a plurality of transparent slots 47 and opaque bars 48 in each of two sectors of the spherical mask lying on each side of the central portion thereof. As mentioned previously the slots and bars from the output mask are in a predetermined relationship to the slots and bars of the input mask. It is understood that the arrangement of the vertical and horizontal slots and bars may be varied and the number of such slots and bars may also be varied, as desired.

Figure 7:
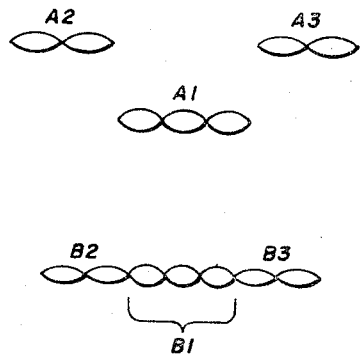
FIGURE 7 shows a plan view of the lenticular plate of FIGURE 6 and, in addition, a plan view of other cooperating lenticular lens plates illustrating an alternative manner of arrangement of the lenticules thereof in an optical system such as shown in FIGURE 2.
Figure 6:
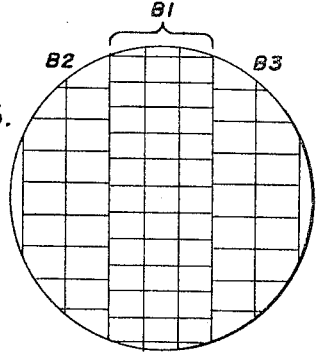
FIGURE 6 shows the face of one of the lenticular plates corresponding to the second lenticular lens plate of FIGURE 2.

In the arrangement described in the preceding figure the center-to-center spacing of the horizontal slots to the vertical slots in the input mask were restricted to a particular ratio. In certain systems to optimize performance of each of the orthogonally related channels it may be necessary to use center-to-center slot spacing for the horizontal and vertical slots which are not related by the aspect ratio factor. When such requirement is removed the lenticules in one or the other plates must be situated at different axial locations. Preferably, the lenticules corresponding to the lenticules in the first plate are so located as it is desirable in accordance with the present invention to locate the lenticules of the second plate close to the slots of the input mask. FIGURES 6 and 7 show an alternative arrangement in accordance with the present invention in which the aspect ratio relation does not exist. FIGURE 6 represents a face view of the second lenticular lens plate and is comprised of a set of three sections, B1, B2, and B3. Section B1 extends over the central portion of the plate. Sections B2 and B3 extend over sectors on each side of the central section. The lenticules in each section are arranged in vertical columns and horizontal rows and have the same aspect ratio as determined by the aspect ratio of the raster used. The dimensions and the focal length of the lenticules in section B1 are different from the dimensions and the focal length of the lenticules in sections B2 and B3 in which they are identical.

FIGURE 7 represents a plan view of the lenticules of the plate of FIGURE 6 and, in addition a set of lenticules corresponding in function to the lenticules of the first lenticular plate. The latter lenticules cooperating with corresponding lenticules in section B1 are denoted A1 and similarly lenticules cooperating with the lenticules in sections B2 and B3 are denoted A2 and A3, respectively. In order to obtain high efficiency and uniformity of illumination of the raster area in accordance with the principles outlined above, it is now necessary to separate the lenticules of the first set into two such sets each located at different axial positions with respect to the aforementioned first set. The dimensions and focal length of the lenticules in one of the two sub-sets are the same. The dimensions and focal length of the lenticules in the other sub-set are also the same but different from those values in the one sub-set. The aspect ratio of the lenses in the two sub-sets is the same and lenticules of each group are also stacked in vertical columns and horizontal rows as in the first set.

In designing the arrangement of FIGURES 6 and 7 the lenticules of sub-set A1 would be axially positioned and the focal lengths thereof set to image light from the source into the vertical slots of the input mask. Similarly, the lenticules of subsets A2 and A3 would be axially positioned and the focal lengths thereof set to image light from the source into the horizontal slots of the input mask. The focal length of the lenticules in section B1 is arranged to image the lenticules in Subset A1 onto the raster, and similarly the focal length of the lenticules in sections B2 and B3 are arranged to image the lenticules in Subsets A2 and A3 onto the raster.

While the invention has been described in specific embodiments it will be appreciated that many modifications may be made by those skilled in the art, and we intend by the appended claims to cover all such modifications and changes as fall within the true spirit and scope of the invention.

What we claim as new and desire to secure by Letters Patent of the United States is:

1. An optical system for projecting light from a source of light to an image area in accordance with deviation of the light produced by a light modulating medium comprising a light mask including an array of alternately opaque and transparent areas interposed between said light source and said modulating medium, a first array of converging lenses interposed between said light source and said light mask for imaging said source in said transparent areas, a second array of converging lenses interposed between said first array of lenses and said mask fo imaging each lens of said first array on a common area of said medium and masking means interposed between said medium and the image area for blocking light emanating from and undeviated by said medium and selectively passing light emanating from said medium in accordance with the diffraction thereof by said medium.

2. An optical system for projecting light from a source of light to an image area in accordance with deviation of the light produced by a light modulating medium comprising a light mask including an array of alternately opaque and transparent areas interposed between said light source and said modulating medium, a first array of converging lenses interposed between said light source and said light mask for condensing light from said source into a plurality of spaced images of light in said transparent areas, a second array of converging lenses interposed between said first array of lenses and said mask, each lens of said second array imaging a respective one of the lens of said first array on a common area of said medium, and masking means interposed between said medium and the image area for blocking light emanating from and undeviated by said medium and selectively passing light emanating from said medium in accordance with the diffraction thereof by said medium.

3. An optical system for projecting light from a source of light to an image area in accordance with deviation of the light produced by a light modulating medium comprising a light mask including an array of alternately opaque and transparent areas interposed between said light source and said modulating medium, a first array of converging lenses arranged in contacting relationship to one another and interposed between said light source and said light mask for condensing light from said source into a plurality of spaced images of light in said transparent areas, a second array of converging lenses arranged in contacting relationship and interposed between said first array of lenses and said mask, each lens of said second array imaging a respective one of the lens of said first array on a common area of said medium, each lens of said second array being close to a transparent area of said mask, and masking means interposed between said medium and the image area for blocking light emanating from and undeviated by said medium and selectively passing light emanating from said medium in accordance with the diffraction thereof by said medium.

4. An optical system comprising a small source of light, an elliptical reflector for imaging said source on an area to be illuminated, a light mask including an array of alternating opaque and transparent areas interposed between said source and reflector and said area, a first array of laterally disposed converging lenses interposed between said light source and said light mask for imaging said source in said transparent areas, a second array of laterally disposed converging lenses interposed between said first array of lenses and said mask, each lens of said second array imaging a respective one of the lenses of said first array on said area.

5. An optical system for projecting light from a source of light to an image area in accordance with deviation of the light produced by a light modulating medium comprising a light mask including a plurality of bars and slots interposed between said light source and said modulating medium, a first array of converging lenticules interposed between said light source and said mask for imaging said source in said slots, a second array of converging lenticules interposed between said first array of lenticules and said mask for imaging each lenticule of said first array on a common area of said medium, each lenticule of said second array having one surface generally planar and the opposite surface spherical, said lenticules of said second array being contiguous so as to form a thin transparent plate with the generally planar area lying in one surface and the spherical surface thereof lying in the opposite surface, said generally planar surface disposed remote from said source of light and defining a surface common with the surface defined by said light mask and masking means interposed between said medium and the image area for blocking light emanating from and undeviated by said medium and selectively passing light emanating from said medium in accordance with the diffraction thereof by said medium.

6. An optical system for projecting light from a source of light to an image area in accordance with the deviation of the light produced by a light modulating medium comprising a light mask including a plurality of bars and slots interposed between said light source and said modulating medium, a first array of converging lenticules interposed between said light source and said mask for imaging said source in said slots, said lenticules of said first array being contiguous so as to form a thin transparent plate, a second array of converging lenticules interposed between said first array of lenticules and said mask for imaging each lenticule of said first array on a common area of said medium, each lenticule of said second array having one surface generally planar and the opposite surface spherical, said lenticules of said second array being contiguous so as to form a thin transparent plate with the generally planar area lying in one surface and the spherical surfaces thereof lying in the opposite surface, said generally planar surface disposed remote from said source of light and defining a surface common with the surface defined by said light mask, and masking means interposed between said medium and the image for blocking light emanating from and undeviated by said medium and selectively passing light emanating from said medium in accordance with the diffraction thereof by said medium.

7. An optical system for projecting light from a source of light to an image area in accordance with deviation of light produced for a light modulating medium comprising a light mask including a plurality of bars and slots interposed between said light source and said modulating medium, a first lenticular plate one surface of which is generally plain and of constant curvature and the opposite surface of which is generally of the same curvature as the one surface and includes a plurality of spherical lenticules extending convexly outward from the surface interposed between said light source and said light mask for imaging said source in said slots, a second lenticular plate having one surface generally plain and of constant curvature and the opposite surface of which is overall the same curvature of said one surface and includes a plurality of spherical lenticules extending convexly outward from the surface thereof interposed between said first plate and said mask for imaging each lenticule of said first plate on a common area of said medium, and masking means interposed between said medium and the image area for blocking light emanating from and undeviated by said medium and selectively passing light emanating from said medium in accordance with the diffraction thereof by said medium.

8. An optical projecting system for projecting an image in accordance with the information contained in orthogonally oriented light deviating deformations in a light modulating medium comprising means providing a source of light, a light mask interposed between said source and the light modulating medium including means defining two sets of bars and slots extending respectively in the directions of the deformations in the medium, a first array of converging lenses interposed between said light source and said light mask for imaging said source in said orthogonally arrayed slots, a second array of converging lenses interposed between said first array of lens and said mask for imaging each lens of said first array on a raster area of said medium, the lenses of said second array arranged in side by side relationship and corresponding in number to the number of lenses in said first array of lenses, the focal length of the lenticules of the said second array being arranged for imaging the lenticules of said first array on the raster area of the modulating medium so that the lens of said other plate is imaged to the full dimension of the raster area, and output light masking means for blocking undeviated light impinging on the light modulating medium and passing deviated light in accordance with information contained in the deformation in the light modulating medium.

9. An optical projecting system for projecting an image in accordance with the information contained in orthogonally oriented light deviating deformations in a light modulating medium comprising means providing a source of light, a light mask interposed between said source and the light modulating medium including means defining two sets of bars and slots extending respectively in the directions of the deformations in the medium, one set included in a central portion of the mask and the other set included in a pair of sectors on each side of the central portion, a first array of converging lenses interposed between said light source and said light mask for imaging said source in said orthogonally arrayed slots, a second array of converging lenses interposed between said first array of lens and said mask for imaging each lens of said first array on a raster area of said medium, the lenses of said second array arranged in side by side relationship and correspond in number to the number of lenses in said first array of lenses, the focal length of the lenticules of the said second array being arranged for imaging the lenticules of said first array on the rast area of the modulating medium so that the lens of said other plate is imaged to the full dimension of the raster area, and output light masking means for blocking undeviated light impinging on the light modulating medium and passing deviated light in accordance with information contained in the deformation in the light modulating medium.

10. An optical projecting system for projecting an image in accordance with the information contained in orthogonally oriented light deviating deformations in a light modulating medium comprising means providing a source of light, a light mask interposed between said source and the light modulating medium including means defining two sets of bars and slots extending horizontally and vertically respectively in the directions of the deformations in the medium, the ratio of the center-to-center spacing of said horizontal slots to the center-to-center spacing of said vertical slots being equal to the aspect ratio of the projected image, a first array of converging lenses interposed between said light source and said light mask for imaging said source in said orthogonally arrayed slots, the lenses of said second array arranged in side by side relationship to form a plate, a second array of converging lenses interposed between said first array of lens and said mask for impinging each lens of said first array on a raster area of said medium, the lenses of said second array arranged in side by side relationship to form a plate and correspond in number to the number of lenses in said first array of lenses, the focal length of the lenticules of the said second array being arranged for imaging the lenticules of said first array on the raster area of the modulating medium so that the lens of said other plate is imaged to the full dimension of the raster area, and output light masking means for blocking undeviated light impinging on the light modulating medium and passing deviated light in accordance with information contained in the deformation in the light modulating medium.

11. An optical projection system for projecting an image in accordance with the information contained in orthogonally oriented light deviating deformations in a light modulating medium comprising means providing a source of light, a pair of transparent plates each of constant curvature and each having a pair of oppositely disposed surfaces one of which is plain and the other of which is lenticular, the plain surface of one of said plates having thereon two sets of bars extending respectively in the directions of the deformations in the medium, the bars in each set being spaced so as to provide a plurality of transparent slots, said one plate interposed between said source and the modulating medium with the lenticulated surface oriented in the direction of the source of light, the other plate interposed between the light source and said first plate for imaging said source of light in said slots, the focal length of the lenticules of one plate being arranged for imaging the lenticules of said other plate on the raster area of the modulating medium so that the lens of said other plate is imaged to the full dimension of the raster area, an output light masking means for blocking undeviated light impinging on the light modulating medium and passing deviated light in accordance with the information contained in the deformations in the light modulating medium.

References Cited

UNITED STATES PATENTS

| 3,016,417 | 1/1962 | Mast et al. | 350—161 X |
| 3,041,395 | 6/1962 | Mast | 178—7.88 |
| 3,263,029 | 7/1966 | Rosenthal | 178—7.5 X |

JOHN W. CALDWELL, *Acting Primary Examiner.*

R. L. RICHARDSON, *Assistant Examiner.*